United States Patent [19]

Georgas

[11] Patent Number: 5,421,303

[45] Date of Patent: Jun. 6, 1995

[54] KIT AND METHOD FOR MINIMIZING COMBUSTION KNOCK IN AN INTERNAL COMBUSTION ENGINE

[76] Inventor: Michael Georgas, 897 E. Geneva Rd., Carol Stream, N.Y. 60188

[21] Appl. No.: 241,151

[22] Filed: May 10, 1994

Related U.S. Application Data

[63] Continuation-in-part of Ser. No. 40,143, Mar. 29, 1993.

[51] Int. Cl.⁶ .............................................. F02P 5/14
[52] U.S. Cl. .................................... 123/421; 123/595
[58] Field of Search ................. 123/41.01, 41.1, 421, 123/595

Primary Examiner—Noah P. Kamen
Attorney, Agent, or Firm—Nixon, Hargrave Devans & Doyle

[57] ABSTRACT

A kit and a method for minimizing combustion knock and improving fuel economy in an internal combustion engine which includes a cooling system having a first thermostat which blocks the flow of coolant until a first specified temperature is reached. The kit includes a second thermostat and a recalibrator. The first thermostat is removed and replaced with the second thermostat which allows coolant to flow at a second specified temperature at least fifteen degrees lower than the first specified temperature. Replacing the first thermostat with the second thermostat reduces the temperature of the engine by about fifteen degrees which helps to minimize combustion knock. A recalibrator is coupled in parallel with the thermistor to modify the control of the engine's fuel system and spark system by the engine's electronic control module. Adding the recalibrator results in a spark timing and fuel setting which further minimizes combustion knock and improves fuel economy.

1 Claim, 2 Drawing Sheets

KIT AND METHOD FOR MINIMIZING COMBUSTION KNOCK IN AN INTERNAL COMBUSTION ENGINE

This application is a continuation-in-part of application Ser. No. 08/040,143, filed Mar. 29, 1993.

FIELD OF THE INVENTION

This invention relates generally to a kit and a method for improving the operation of an internal combustion engine and more particularly to a kit and a method for minimizing combustion knock and improving fuel economy in an internal combustion engine.

BACKGROUND OF THE INVENTION

Combustion knock is an undesirable phenomena which occurs in internal combustion engines. During the compression cycle in an engine cylinder, a spark from a spark plug ignites a portion of a compressed air/fuel mixture in the cylinder. As the spark-ignited portion of the mixture burns, the remainder of the mixture is heated above its self-ignition temperature.

Time-consuming chemical reactions in the fuel delay the self-ignition of the remainder of the mixture. During normal combustion, the spark ignited portion of the mixture burns rapidly enough to consume the remainder of the mixture before the chemical reactions can be completed.

Combustion knock takes place when the remainder of the mixture self-ignites before the spark-ignited portion of the mixture can burn that remainder. The self-ignition causes undesirable noise and overheating in the engine cylinder and often causes mechanical damage to engine parts, such as the pistons and spark plugs.

The problem of combustion knock is particularly common during warm weather. The warmer weather raises the temperature of the engine and thus of the unburned mixture. As a result, the chemical reactions in the remainder of the mixture are often initiated more quickly, allowing the unburned mixture to self-ignite before being consumed by the spark-ignited portion of the mixture.

To combat the problem of combustion knock, mechanics and manufacturers often recommend the use of higher octane fuels. Chemical reactions in higher octane fuels take longer to complete before self-ignition than in lower octane fuels. The longer delay in completing the reactions provides the spark-ignited portion of the mixture more time to burn the remainder of the mixture before self-ignition can occur. Unfortunately, the delay often is not long enough to prevent combustion knock from taking place. Additionally, the use of higher octane fuels increases the operating costs of the internal combustion engine.

Accordingly, a general object of the invention is to provide a kit and a method to improve the operation of an internal combustion engine.

Another object of the invention is to provide a kit and a method to minimize or eliminate combustion knock.

A further object of the invention is to provide a kit and a method to improve the fuel economy of an internal combustion engine.

Other objects and advantages will become apparent from the following description of the invention.

SUMMARY OF THE INVENTION

According to the present invention, an internal combustion engine may be modified using a kit and a method for minimizing combustion knock and improving fuel economy. The internal combustion engine includes: a fuel system; an ignition system which includes spark plugs and a spark timing system; a cooling system with a first thermostat which blocks the flow of coolant until a first specified temperature is reached; a thermistor which communicates with the coolant in the cooling system and has a resistance which varies with the temperature of the coolant; and an electronic control module coupled to the thermistor to measure the voltage across the thermistor, the voltage changing with changes in the temperature of the coolant, whereby the electronic control module controls the operation of the spark timing system and the fuel system by selecting information from preprogrammed tables in response to the measured voltage drop. The kit includes a second thermostat (as specified below) and a recalibrator. The method involves replacing the first thermostat with the second thermostat and coupling the recalibrator in parallel with the thermistor.

The second thermostat allows coolant to flow when a second specified temperature, at least fifteen degrees lower than the first specified temperature, is reached. Allowing coolant to circulate at a lower temperature lowers the temperature of the engine block and head and thus increases the amount of time needed for the unburned mixture to reach its self-ignition temperature. This delay allows the spark-ignited portion of the mixture to consume most, if not all, of the unburned mixture before self-ignition and combustion knock can take place.

The addition of the recalibrator in parallel with the thermistor modifies the voltage drop measured by the electronic control module. Preferably, when the coolant temperature is at the second specified temperature, the electronic control module will measure a voltage drop corresponding to that produced at the first specified temperature before the modification. When the voltage drop readings are altered, the electronic control module selects preprogrammed information originally intended for higher coolant temperatures. As a result, spark timing is retarded more quickly, further minimizing the problem of combustion knock; and a leaner air/fuel mixture is reached more quickly, improving fuel economy.

BRIEF DESCRIPTION OF THE DRAWINGS

For a better understanding the present invention, reference is made to the accompanying drawing which is incorporated herein by reference and in which.

DETAILED DESCRIPTION OF THE INVENTION

Figure 1:
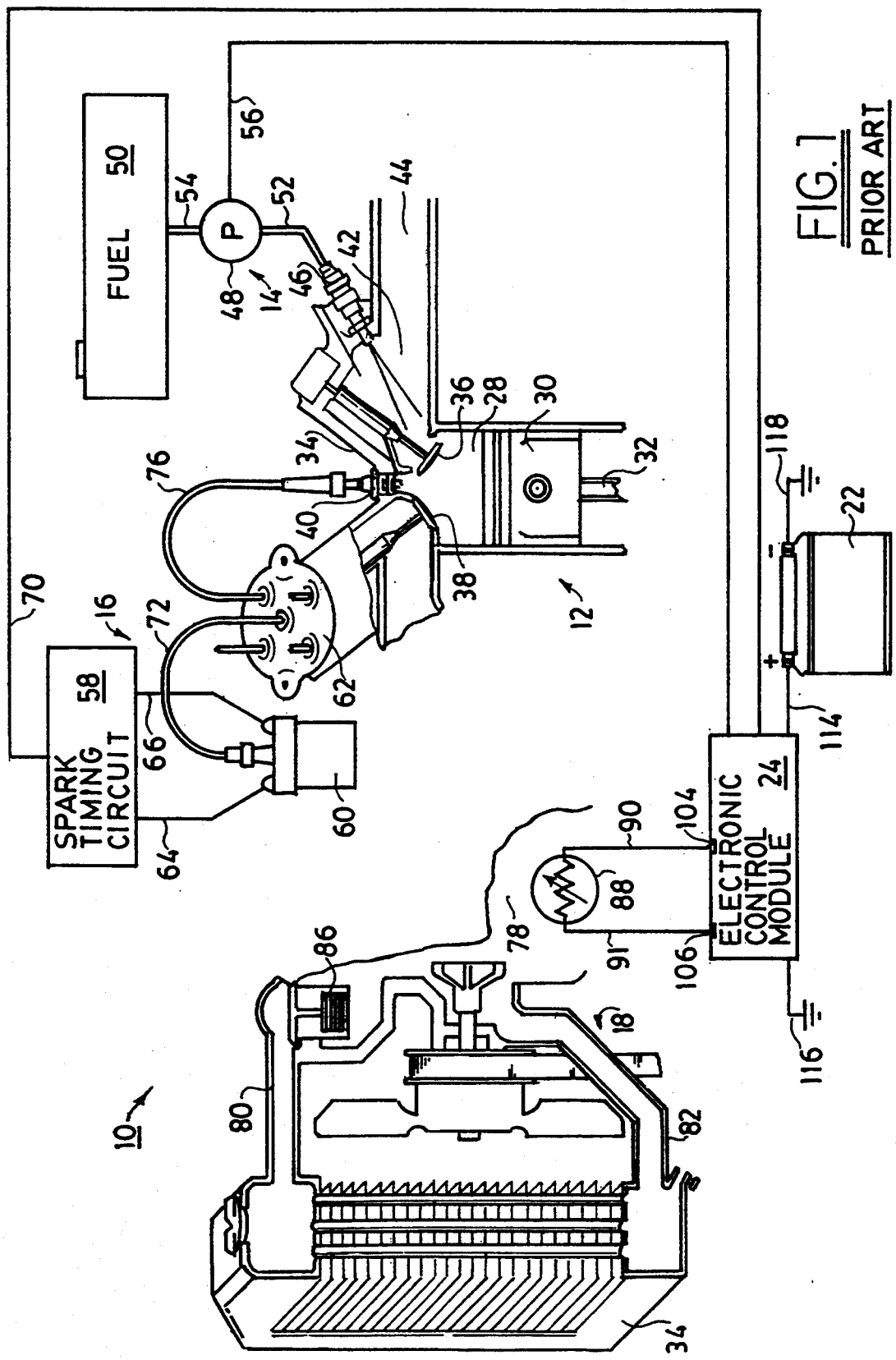
FIG. 1 is a partial diagrammatic view and a partial block diagram view of an internal combustion engine.
Figure 2:
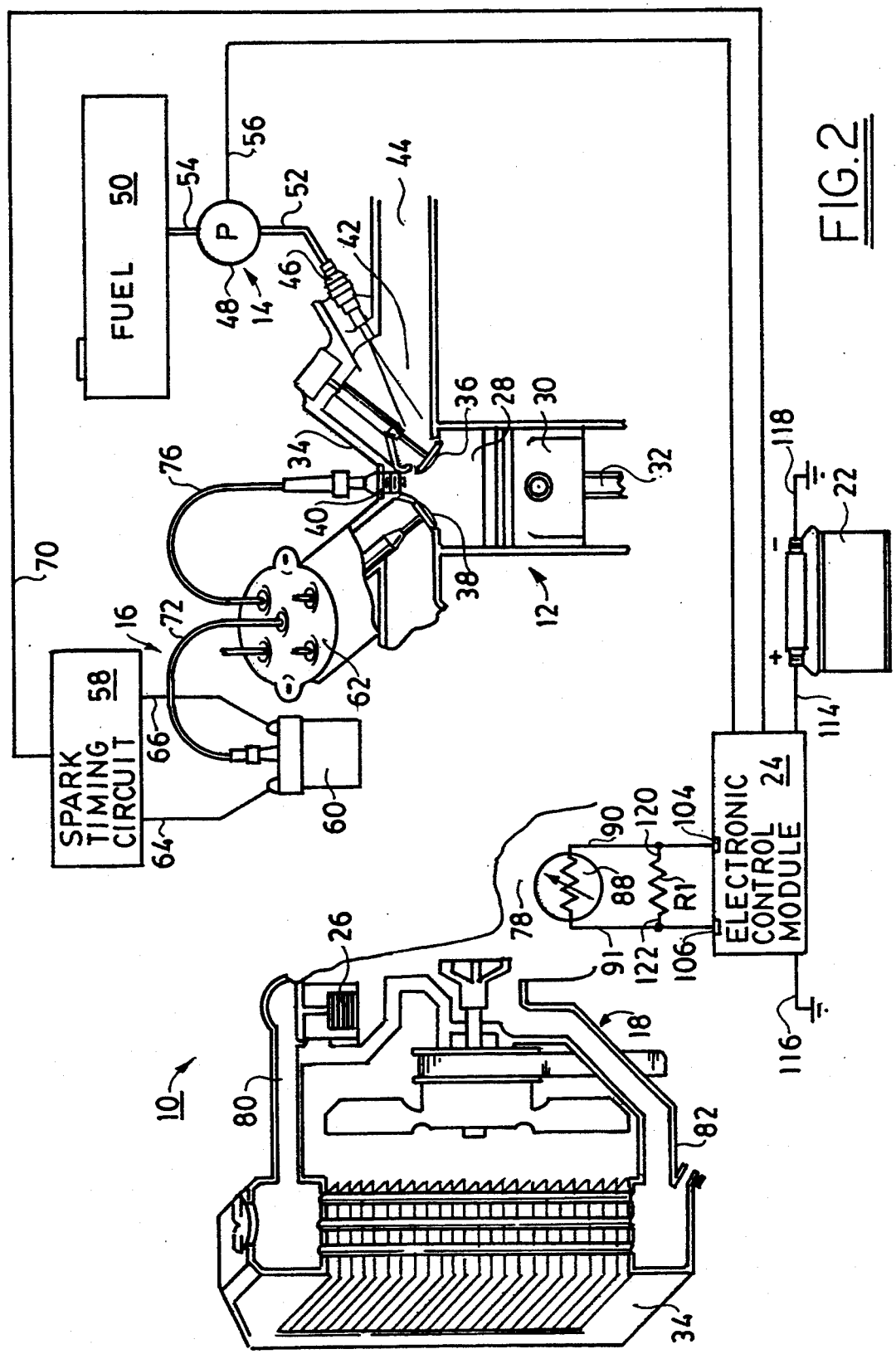
FIG. 2 is a partial diagrammatic view and a partial block diagram view of an internal combustion engine using the kit and the method in accordance with the invention.

A conventional internal combustion engine 10 is illustrated in FIG. 1 and the corresponding modified internal combustion engine 10 using a kit or a method for minimizing combustion knock and improving fuel economy in accordance with the invention is illustrated in FIG. 2. The major components of an internal combustion engine 10 include an engine block 12, a fuel metering system 14, a spark control system 16, a cooling system 18, a thermistor 88, a battery 22 and an electronic control module 24. As shown in FIG. 2, the herein-described kit and the method involve the use of a second thermostat 26 and a recalibrator R1.

Referring to FIG. 1, the internal combustion engine 10 has at least one cylinder 28 cast into the engine block 12. A piston 30 rides in each cylinder 28 and is connected to a crankshaft by a connecting rod 32. The crankshaft (not shown) converts the motion of each piston 30 to rotary motion. The "top" of each cylinder 28 is sealed by a cylinder head 34 and typically includes at least one intake valve 36 and at least one exhaust valve 38, both of which are normally closed. The cylinder head 34 also includes an opening for a spark plug 40.

The fuel metering system 14 includes an intake manifold 42, an air passage 44, at least one fuel injector 46, a fuel pump 48, and a fuel tank 50. The intake manifold 42 is connected to each intake valve 36 and to the air passage 44. The fuel injector 46 extends into the intake manifold 42 and is connected to the fuel pump 48 by a pipe 52. The fuel pump 48 is connected by another pipe 54 to the fuel tank 50 and by a lead 56 to the electronic control module 24. Although one particular type of fuel metering system 14 is shown, it is well known within the art that other types of fuel metering systems 14 could be used by the internal combustion engine, such as a carburetor system or another type of fuel injection system.

The spark control system 16 includes a spark timing circuit 58, an ignition coil 60, a distributor 62, and the spark plug 40. The spark timing circuit 58 is connected by a pair of leads 64 and 66 to the ignition coil 60 and is connected by another lead 70 to the electronic control module 24. The ignition coil 60 is grounded to the engine block 12 and has a lead 72 coupled to a distributor 62. The distributor 62 has a lead 76 coupled to the spark plug 40. Although one particular type of spark control system 16 is shown, it is well known within the art that other types of spark control systems 16, such as an electronic ignition system, could be used by the internal combustion engine 10.

The cooling system 18 includes a series of interconnecting waterways 78, hoses 80 and 82, a radiator 84, and a thermostat 86. The waterways 78 are cast into the engine block 12 and pass around the cylinder 28 and cylinder head 34 to form a continuous path. One hose 80 connects one end of the radiator 84 to one end of the path for the waterways 78 and the other hose 82 connects the other end of the radiator to the other end of the path. The radiator 84 is filled with some type of coolant, such as water and/or antifreeze. The first thermostat 86 is located in the waterway 78 after the one hose 80 and blocks the circulation of coolant from the radiator 84 to the waterways 78 until the thermostat 86 reaches a first specified temperature. The coolant is allowed to circulate until its temperature drops below the first specified temperature. The first thermostat 86 roughly regulates the temperature of the engine by regulating the circulation of the coolant. Most automobile manufacturers have selected a first thermostat 86 which opens at approximately one-hundred-and-ninety-five degrees. Although one particular type of cooling system 18 is shown, it is well known within the art that other types of cooling systems 18, such as air cooled systems, could be used by the internal combustion engine 10.

The thermistor 88 is coupled to the electronic control module 24, with one lead 90 coupled to input 104 and the other lead 91 coupled to input 106. The thermistor 88 is immersed in (but isolated electrically from) the coolant in the cooling system 18 and has a resistance value which drops as the temperature of the coolant increases. The voltage drop across the thermistor 88 fluctuates with changes in the coolant temperature and is representative of the coolant temperature.

The electronic control module 24 is preprogrammed with conventional look-up tables which are used to regulate the amount of fuel supplied, as well as the timing of the spark, in response to the coolant temperature. As discussed above, the electronic control module 24 is coupled to the thermistor and is also coupled to the fuel pump 48 and spark timing circuit 58. As the engine is running, the electronic control module 24 monitors the voltage drop across the thermistor 88 and selects information from preprogrammed tables for the fuel pump 48 and the spark timing circuit 58 based on the voltage drop. The electronic control module 24 transmits this information to the fuel pump 48 and the spark timing circuit 58 by the leads 56 and 70. Based on this information, the fuel pump 48 regulates how much fuel is drawn from the tank 50 and supplied to the injector 46. Similarly, the spark timing circuit 58 determines when to trigger the ignition coil 60 to produce a pulse based on this information. The preprogrammed tables in the electronic control module 24 are designed to make the air/fuel mixture leaner and to retard the spark timing as coolant temperature increases. The rate at which these changes occur depends upon the original calibration, which is usually based on the first specified temperature.

A car battery 22 supplies power to the electronic control module 24 via lead 114 and has another lead 118 connected to ground. Likewise, the electronic control module has a lead 116 connecting it to ground. Although not shown, the car battery 22 also provides power to other parts including, the fuel pump 48, the fuel injector 46, the spark timing circuit 58 and the ignition coil 60.

The internal combustion engine 10 described above operates on a four stroke cycle called intake, compression, power and exhaust. During intake, the piston 30 is moving from the top of the cylinder 28 to the bottom and the intake valve 36 is open. The pump 48 draws fuel from the tank 50 through the pipe 54 and supplies it through the other pipe 52 to the injector 46 which sprays the fuel into the intake manifold 42, assuming the fuel metering system 14 described is used rather than another type of system. Air supplied from the air passage 44 mixes with the fuel in the intake manifold 42. The movement of the piston 30 in a downward direction generates a partial vacuum in the cylinder 28 which draws in an air/fuel mixture through the intake valve 36.

During compression, the intake valve 36 is closed and the piston 30 at the bottom of the cylinder 28 is driven towards the top of the cylinder 28 compressing the air/fuel mixture against the cylinder head 34. When the piston 30 nears the top of the cylinder 28, the spark timing circuit 58 triggers the ignition coil 60 to produce a spark pulse which is fed to the distributor 62. The distributor 62 detects the position of a cam (not shown) and in response routes the pulse to the appropriate spark plug 40 which generates an electric spark that ignites a portion of the air/fuel mixture in the cylinder 28.

During power, the ignited portion of the air/fuel mixture burns rapidly and the remainder of the mixture is heated above its self-ignition temperature. Normally, the ignited portion of the mixture consumes the remainder of the mixture before self-ignition takes place. The combustion of the mixture forces the piston 30 down from the top of the cylinder 28, which drives the crankshaft.

Combustion knock takes place when the remainder of the mixture self-ignites before the spark-ignited portion of the mixture can consume the remainder of the mixture. The self-ignition of the remainder of the mixture causes undesirable noise and overheating in the engine cylinder 28 and often causes mechanical damage to engine parts, such as the piston 30 and spark plug 40.

Combustion knock occurs because automobile manufacturers have calibrated the preprogrammed tables to a temperature which is not compatible for all weather conditions, typically the first specified temperature of the first thermostat 86. In warmer weather, the outside temperature causes the engine temperature to increase which increases the chance of self-ignition of the unburned mixture causing combustion knock.

During exhaust, the exhaust valve 38 opens and the piston 30 is driven up from the bottom of the cylinder 28 forcing the exhaust gases out through the exhaust valve 38. When the piston 30 reaches the top of the cylinder 28, the four stroke cycle starts over again. Operating the engine through the four stroke cycle generates a significant amount of heat over time.

FIG. 2 illustrates the internal combustion engine using the kit and a method for minimizing combustion knock and improving fuel economy in accordance with the invention. Corresponding elements in FIG. 2 have numeral designations which correspond to those numeral designations used in FIG. 1 and will not be described again.

The first thermostat 86 in the cooling system is replaced by a second, different thermostat 26 which will open at a second specified temperature at least fifteen degrees lower than the first specified temperature for which thermostat 86 is rated. Preferably, the second thermostat 26 opens between one-hundred-and-sixty and one-hundred-and-eighty degrees. Additionally, the recalibrator R1 is coupled in parallel with the thermistor 88, with one lead 122 coupled between lead 91 and input 106 and with the other lead 120 coupled between lead 90 and the input 104. The recalibrator R1 modifies the voltage measured by the electronic control module as explained in greater detail later. The value of the recalibrator R1 will vary depending upon the second thermostat 26 and the particular electronic control module. For example, in Ford vehicles with a second thermostat 26 which opens at one-hundred-and-sixty degrees, recalibrator R1 would have a value of about 7800 ohms and with a second thermostat 26 which opens at one-hundred-and-eighty degrees, recalibrator R1 would have a value of about 1500 ohms. In Chrysler vehicles with a second thermostat 26 which opens at one-hundred-and-sixty degrees, recalibrator R1 would have a value of about 2600 ohms and with a second thermostat 26 which opens at one-hundred-and-eighty degrees, recalibrator R1 would have a value of about 5600 ohms. In General Motors and A.M.C. vehicles with a second thermostat 26 which opens at one-hundred-and-sixty degrees recalibrator R1 would have a value of about 890 ohms and with a second thermostat 26 which opens at about one-hundred-and-eighty degrees, a recalibrator R1 would have a value of about 2850 ohms.

The recalibrator R1 may be coated with a protective layer, such as epoxy. With the protective layer, the recalibrator R1 is protected from engine heat. Preferably, each lead 120 and 122 of the recalibrator R1 is a flexible connector. With the flexible connectors, the connection of lead 122 between lead 91 and input 106 and the connection of lead 120 between lead 90 and input 104 would not be broken by mechanical vibrations.

When the engine is operating with the kit installed, the coolant begins to circulate through the cooling system at a lower temperature because of the substitution of second thermostat 26 for first thermostat 86. The earlier start for the coolant flow, lowers the temperature of the engine and increases the time needed for the unburned mixture to reach self-ignition. This delay allows the spark-ignited portion of the mixture to consume most, if not all, of the remainder of the mixture before self-ignition, thus minimizing or eliminating combustion knock.

Although replacing the first thermostat 86 with the second thermostat 26 helps to minimize the problem of combustion knock, it generally does not eliminate the problem and also causes the spark timing and fuel system to operate at undesirable settings. Typically, the desired settings for the fuel metering system 14 and the spark control system 16 in the preprogrammed tables are assigned to the first specified temperature. With the second thermostat 26 installed, the coolant temperature remains lower and usually does not reach the first specified temperature. As a result, the electronic control module 24 selects an air/fuel setting for the fuel metering system 16 during normal operations which is to rich and wastes fuel. Additionally, the electronic control module 24 selects a spark timing setting which is advanced to far and may contribute to the problem of combustion knock.

More desirable settings are obtained by adjusting the voltage drop measured by the electronic control module 24. With the addition of the recalibrator R1, the resistance between inputs 104 and 106 is altered. The added resistance alters the voltage drop measured by the electronic control module 24. Preferably, when the electronic control module 24 measures a voltage drop representative of the first specified temperature, the actual temperature of the coolant will be the lower second specified temperature.

The altered voltage drop readings cause the electronic control module to select settings for the fuel system and the spark timing system originally intended for higher coolant temperatures. Specifically, the electronic control module 24 selects spark timing settings where spark timing is retarded more quickly and selects air/fuel settings which become leaner more quickly. Retarding the timing of the spark at lower coolant temperatures helps further minimizes the problem of combustion knock by reducing the chance of self-ignition. Reaching the leaner air/fuel mixture more quickly improves fuel economy because less fuel is used.

Having thus described the basic concept of the invention, it will be readily apparent to those skilled in the art that the foregoing detailed disclosure is intended to be presented by way of example only, and is not limiting. Various alterations, improvements, and modifications will occur and are intended to those skilled in the art though not expressly stated herein. These modifica- tions, alterations and improvements are intended to be suggested hereby, and are within the spirit and scope of the invention. Accordingly, the invention is limited only by the following claims and equivalents thereto.

What is claimed is:

1. A method for minimizing combustion knock and improving fuel economy in an internal combustion engine which includes a cooling system with a first thermostat which blocks the flow of coolant until a first specified temperature is reached; a thermistor which is immersed in the coolant in the cooling system and has a resistance which varies with the temperature of the coolant; an electronic control module coupled to the thermistor to measure the voltage drop across the thermistor which changes with changes in the temperature of the coolant, whereby the electronic control module controls the operation of a spark timing system and a fuel system by selecting information from preprogrammed tables based upon the measured voltage drop; and a battery coupled to the power source and the electronic control module, said method comprising the steps of:

replacing the first thermostat with a second thermostat which allows coolant to flow at a second specified temperature at least fifteen degrees lower than the first specified temperature; and coupling means for resisting in parallel with the thermistor.

* * * * *